July 31, 1934.  R. E. KOUBA  1,968,405
BEEHIVE FRAME LOCKING BAR
Filed Jan. 24, 1933
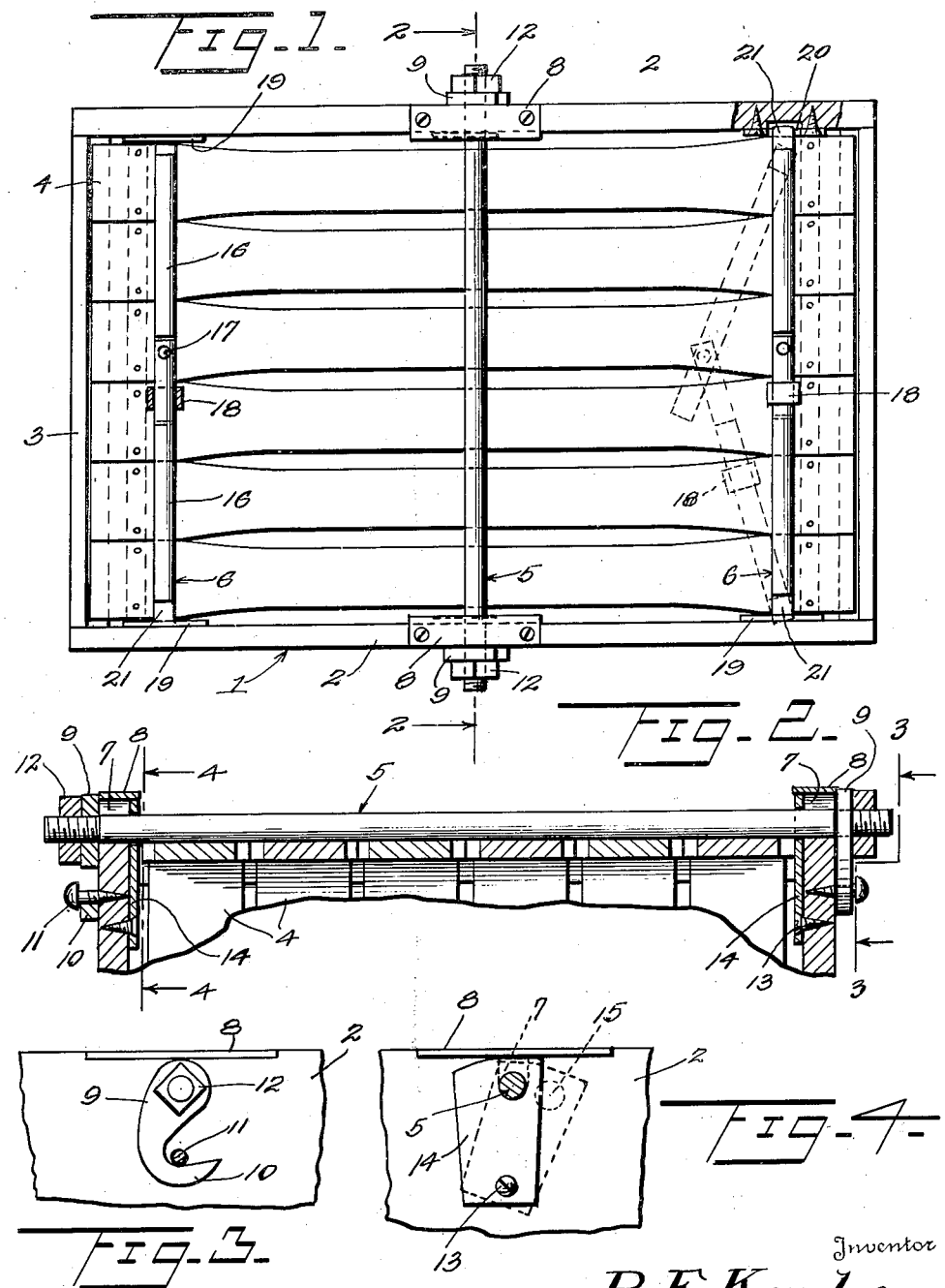
Inventor
R. E. Kouba
By Watson E. Coleman
Attorney Patented July 31, 1934

1,968,405

UNITED STATES PATENT OFFICE 1,968,405

BEEHIVE FRAME LOCKING BAR

Richard E. Kouba, Omaha, Nebr.

Application January 24, 1933, Serial No. 653,341

7 Claims. (Cl. 6—2)

This invention relates to the class of bee culture and pertains particularly to improved means for securing the brood and honey frames in a hive.

The invention is broadly directed to means whereby the swarming of the hive may be prevented. When a hive is preparing to swarm queen cells are built in which are deposited eggs for the production of a new queen for the bees left in the hive, as the old queen deserts the hive with the swarm. These queen cells are built on the sides of the comb in a downward position and if the hive is inverted with the frames, the queen cells are also reversed so that they point skyward. When this is done the bees will destroy the queen cells and the impulse to swarm is broken.

The present invention has for its primary object, therefore, the provision of a novel means for securing the frames in position in the hive so that the hive may be readily inverted for examination by the bee keeper to determine whether or not the bees are preparing to swarm, and may be retained in this position if the bees are preparing to swarm, so that the swarming impulse will be broken.

Another object of the invention is to provide a means for locking the frames in the hive which is easily and quickly manipulated to secure the frames in place or to remove them as desired.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in top plan of a hive from which the top has been removed, showing the bar devices embodying the present invention in position over the frames to retain the same in place when the hive is inverted;

Figure 2 is a transverse sectional view taken through the top portion of the hive substantially upon the line 2—2 of Figure 1, the frames being shown empty or free of comb structure;

Figure 3 is a sectional view taken upon the line 3—3 of Figure 2;

Figure 4 is a sectional view taken upon the line 4—4 of Figure 2.

Referring now more particularly to the drawing wherein like numerals of reference indicate corresponding parts throughout the several views, the numeral 1 indicates generally the body of the hive which comprises the side walls 2 and end walls 3. The top of the hive has been removed and is not shown.

Within the hive are suspended the usual brood frames 4 in each of which a comb structure is built by the bee.

In carrying out the present invention there are provided the locking or retaining bars 5 and 6 which are removably positioned in the top of the hive above the frames 4 in the manner about to be described.

The bar 5 is preferably in the form of a rod of circular cross section and the top edges of the side walls 2 are provided at their transverse centers with the recesses 7 in which the ends of the bar 5 are positioned. These recesses are covered by the plates 8 which are counter-sunk in the top edges of the walls 2 and secured in the manner illustrated.

Each end of the bar 5 is screw-threaded as illustrated in Figure 2 and threaded onto each end is a hook body 9 which positions against the outer face of the adjacent side wall and which has the bill portion 10 engaged under a stud 11 secured in the wall. The stud shown is in the form of a screw although, obviously, any other form of stud may be employed and the invention is, therefore, not to be limited to this particular structure.

The hooks 9 are mounted upon the ends of the rod 5 with their bills oppositely directed so that they may be readily oscillated and unscrewed from the ends of the rod.

Each end of the rod 5 also has threaded thereon a nut 12 which serves to lock the adjacent hook body in position.

Upon the inner side of each wall 2 of the hive is oscillatably mounted upon a screw 13 the plate 14. Each of these plates 14, which is of elongated rectangular design and normally vertically disposed, has an aperture 15 therethrough which registers with the adjacent recess 7 so as to permit the extension of the rod 5 therethrough. This plate serves to close the upper part of the adjacent recess 7 so as to prevent the bees from entering or leaving the hive by means of the recess. As shown in Figure 4 the upper end edge of the plate 14 is cut on two angularly related straight lines so that when the plate is vertically disposed a portion of the top edge will position parallel with the under surface of the adjacent plate 8 and when the rod 5 is removed and the plate 14 is oscillated to the dotted position shown in Figure 4 the other portion of the top edge will come into parallel relation with the adjacent plate 8 and thus tightly close the adjacent recess 7 to prevent the use of this recess as an exit by the bees when the rod is not in place.

The bars 6 which are employed across the ends of the frames 4, are formed in the two portions shown, each of which portions is indicated by the numeral 16. These portions 16 are in overlapping relation at the center of the bar and are pivotally connected by the pin 17 as shown. When the portions 16 of the bar have been shifted from the broken dotted line position illustrated at the right of Figure 1, to the straight or aligned position in which they are shown in full lines, there is shifted longitudinally on the bar the collar 18 to the position shown, which couples the overlapping ends of the portions together so that the bar becomes rigid.

The inner face of each wall 2 of the hive is fitted adjacent each end with a slotted plate 19 in the slot 20 of which the reduced tongue-like end 21 of a bar engages when the portions of the bar are in alignment. As will be readily seen upon reference to Figure 1, when the bar is broken these tongue-like ends thereof will be removed from the slots of the plates 19 so that the bars may be removed.

While the bars 6 have been illustrated as being in the form of rods of circular cross section it is to be understood that the invention is not to be limited to rods of this character for it will be readily apparent that these rods may be made of angle iron material if desired.

In a hive equipped to receive the comb frame retaining bars of the character herein set forth, bee collectors or apiarists may readily determine the character of the combs and whether or not the bees are preparing to swarm, for, by securing the bars in the manner shown over the tops of the frames the hive may be completely inverted so that a clear view may be had of the interior between the narrow lower bars of the frames.

If the bees are preparing to swarm this will be immediately evident to the apiarist who will see the queen cells in the process of construction. The hive may then be mounted in inverted position so as to turn the queen cells upwardly and, as previously stated, this will result in their being destroyed by the bees of the hive and the breaking of the desire to swarm.

The bars disposed across the frames will thus securely support the same while the hive is in the inverted condition.

Having thus described the invention, what is claimed is:—

1. In a bee hive having a top opening through which frames are inserted for suspension therein, means for securing said frames to permit the inversion of the hive, consisting of a rigid body positioned across the tops of the frames, and means for detachably coupling the ends of said rigid body with opposed walls of the hive, whereby when the hive is inverted, the frames will be held in place by the body.

2. In a bee hive having a top opening and having brood frames suspended therein, means for securing said frames to permit inversion of the hive, comprising an elongated rigid body disposed across the opening in contact with the tops of the frames, the walls of the hive adjacent the ends of the rigid body being recessed to receive said ends, and means carried by the ends of the rigid body for detachably coupling the same with the walls.

3. In a bee hive having brood frames suspended therein, means for securing said frames to permit inversion of the hive, comprising an elongated rigid body disposed across the tops of the frames, the walls of the hive adjacent the ends of the rigid body being recessed to receive said ends, means carried by the ends of the rigid body for detachably coupling the same with the walls, and means mounted upon the recessed walls of the hive whereby said recesses may be closed upon removal of the rigid member.

4. In a bee hive having brood frames therein, means for securing the frames to permit inversion of the hive, comprising a bar disposed across the tops of the frames, the walls adjacent the ends of the bar having edge recesses to receive said ends, a hook member threaded on and swingingly suspended from an end of said bar, and an element rigidly secured in each side wall of the hive with which the adjacent hook engages.

5. In a bee hive having a plurality of brood frames suspended therein and having the top edges of two opposed walls provided with recesses, an elongated member disposed transversely of said frames with its ends positioned in said recesses, and plate members secured to the edges of said walls across said recesses.

6. In a bee hive having a plurality of brood frames suspended therein and having the top edges of two opposed walls provided with recesses, an elongated member disposed transversely of said frames with its ends positioned in said recesses, and plate members secured to the edges of said walls across said recess, an apertured plate oscillatably secured to each of said walls, through which the adjacent end of said member passes, each of said last plates being designed to be shifted to a position to bring an imperforate area into position over the adjacent recess when the frame retaining member is removed.

7. In a bee hive having brood frames suspended therein, means for securing the frames to permit inversion of the hive, comprising a bar positioned transversely of the tops of the frames within and below the top edges of the walls of the hive and having its ends removably disposed in recesses formed in the inner faces only of the adjacent walls, said bar being divided into two pivotally coupled portions whereby it may be broken for insertion into or removal from the hive, and means for locking the pivotally joined ends of the bar together.

RICHARD E. KOUBA.